Patented Mar. 10, 1942

2,276,010

UNITED STATES PATENT OFFICE 2,276,010

RESISTANCE WELDING

George S. Bernard, Jr., New Kensington, Pa., assignor to Aluminum Company of America, Pittsburgh, Pa., a corporation of Pennsylvania No Drawing. Application September 22, 1939, Serial No. 296,094

18 Claims. (Cl. 219—10)

This invention relates in general to electric resistance welding and more particularly to an improved process for spot and seam welding light metals and their alloys, such as aluminum and magnesium, characterized by having high conductivity.

In order that the present invention may be thoroughly understood, the various problems met with in spot welding are set forth herein, in view of which the objects, purposes, and methods of the invention may be more readily pointed out. In spot welding generally two work pieces are customarily lapped and inserted between two electrodes. The electrodes are then actuated to engage the lapped work pieces and are usually made to exert some pressure upon the work. During some interval between engagement and disengagement of the electrodes, electric current is passed through the electrodes and the work pieces to effect resistance heating in the material to be welded. The combined heating and pressure effect the weld.

In addition to the resistance heating developed in the work pieces adjacent the electrodes, the passage of welding current during a welding operation results in some usually undesirable resistance heating immediately adjacent each work piece-electrode juncture. The heating thus developed adjacent these junctures is relatively large during the welding of metals of high electrical conductivity, such as the light metals and their alloys, because of the fact that high concentrations of current must be applied to the work in relatively short time intervals in order to weld the same without loss of heat by conduction. In usual welding practice, then, suitable copper alloy electrodes (being capable of carrying high current densities) are employed to direct the current to the weld, and even though the electrodes may be internally or otherwise cooled, there remains to some degree, nevertheless, a deleterious condition of localized heating adjacent each electrode-work piece juncture.

Probably one of the most undesirable results of local heating at these junctures lies in the fact that the electrode tips pick up metal from the work piece surfaces, a tendency especially noticeable as the number of welds made with any given pair of electrodes increases. It is believed that the local heating causes alloying or mechanical adherence of metal from the work piece surfaces to the electrode tips; such alloying or mechanical adherence is commonly referred to as "pick up."

In practice, welds made with electrodes characterized by pick up show an impaired surface condition, the work pieces having pitted surfaces characterized by a very low resistance to corrosion. Such electrodes also quite often stick to the surfaces of the metal being welded causing interference with the operation and productivity of a welding machine. To avoid these undesirable results regular cleaning or "dressing" of the electrodes has been found necessary.

It is a general object of the present invention to provide a method which will control the concentration of heat or local heating at a juncture of an electrode and work piece in resistance welding processes; a further object, particularly in spot and seam welding, is to minimize local heating at such a juncture; and another object is to increase local heating adjacent an electrode-work piece juncture when such a condition is deemed desirable.

A further object of the invention is a provision of a method which makes it possible to duplicate a weld in a number of work pieces having surfaces exhibiting uniform and unimpaired appearance. It is also an object of the present invention to provide an improved method of welding whereby it is possible to weld, without attention to the electrode or electrodes, a greater number of pieces having surfaces of improved appearance which are more resistant to corrosion than has been heretofore possible in former practices.

It is a further object of the invention to prolong the life of an electrode surface or tip before it must be refinished, dressed, or cleaned whereby a greater number of suitable uniform welds can be made without undesirable pick up on an electrode. An ancillary object is to make it possible to equalize the working lives of two electrodes forming a working pair, or to prolong the life of one electrode at the expense of, and without attention to the other between times at which they would normally be dressed.

A significant object of the invention is to provide a method for controlling the penetration of welding heat, thereby to control and concentrate the location of a weld zone.

In the development of this invention, it was discovered that, in resistance welding of light metals, the local heat developed at the surface of a work piece in contact with a copper or copper alloy electrode was materially lessened and substantially eliminated when the direction of current flow was from the work piece to the electrode as compared to a current flow in the opposite direction. From this observation it followed that the local heating is confinable to one side or surface of a welded joint in accordance with the direction of current flow from the electrode through the plates or work pieces constituting the welded joint.

The heat usually developed at such an electrode-work piece juncture causes some local heating and melting of the outer surface of the work piece; and, when this heating is intensified by the effect of a direction of current flow, such as from a copper electrode to an aluminum or magnesium work piece, it is believed to cause a relatively greater amount of alloying or pick up of metal of the part being welded on the tip of the welding electrode. This alloyed material or pick up must be frequently removed from the tip of the welding electrode if certain desired conditions in the work are to be maintained.

It was a further discovery in the development of this invention that the heating effect traceable to the direction of current flow at an electrode-work piece juncture was most marked at the beginning of a welding cycle. Therefore it was found by actual experience that local heating may be controlled (either minimized or increased) not only in direct current welding, in which the current flow is in the direction prescribed, but also in alternating current welding, in which case the direction of flow of the first one-half cycle of current is in the direction prescribed, regardless of the number and direction of flow of subsequent half cycles in a multi-cycle application of welding current.

The present invention makes available a method of controlling local heating at a selected electrode-work piece juncture for the purposes hereinafter described in the following paragraphs.

In a particular instance of alternating current resistance welding, it was found that the number of welds which could be made before it was necessary to dress an electrode was increased from 20 to 40 welds when the above described method of control was employed. This improvement could be obtained at one electrode only because of the fact that, when the current was controlled to permit less heating at the outer surface of one work piece, increased localized heating was generated at the outer surface of the other work piece making up the welded joint.

Furthermore, since many welded assemblies require an unpitted and otherwise unimpaired appearance on only one surface, the invention may be employed by controlling the direction of current flow during the first half cycle so as to reduce the heating at that surface, thereby minimizing the pitting and melting of the surface which would ordinarily disfigure the same. Under these same conditions it will be necessary to dress the electrode tip at that surface appreciably less often to produce duplicate welds of a given standard of appearance. Furthermore, minimization of electrode dressing greatly increases weld production while at the same time increasing the working life of an electrode.

The process of this invention also lends itself readily to the welding of work pieces of unequal thickness in which case the local heating at one surface may be minimized at the surface of the thin material, if desired, in order to prevent and control the penetration of local heat into the weld zone. Conversely, the local heating may be intensified at the surface of the work piece of greater thickness.

To this point in the description of the present invention the welding electrodes were assumed to be of uniform cross section and configuration. It is often customary, however, in certain types of spot welding machines to make one electrode convex in shape and of smaller diameter than the other electrode, the second electrode having a relatively flat work engaging surface. An analogous situation may exist in many seam welding machines wherein a thin rotating electrode wheel may be considered a relatively small, current-concentrating electrode and a flat work surface or relatively broad electrode wheel may be considered a work-supporting and current-conducting means analogous to the flat electrode of a spot welding machine.

With machines of the type just described, the small area of contact between the convex welding electrode and the work piece during the first half cycle of current flow results in a higher current density than that which prevails after the work has been softened under welding heat and the electrode has sunk into the work under welding pressure. This condition results in a type of local heating adjacent an electrode-work piece juncture which may be conveniently offset in part by a minimization of that portion of local heating traceable to the initial direction of current flow at the bi-metal joint; or the local heating at such joint may be increased to give a cumulative local heating effect where desirable, as in cases where the work pieces being welded are of unequal thickness and it is desired to control the penetration of the welding heat into the weld.

It will be manifest to those skilled in the art to which this invention appertains that the improved process of resistance welding hereinabove described will find numerous applications. For example, the invention will lend itself to welding operations wherein it is desirable to reduce or control the local heating at a relatively inaccessible electrode, such as within a tank or other enclosed structure. Another important usefulness of the invention is the equalization of the wear or pick up on a pair of electrodes by alternating the initial direction of current flow in successive welds.

In summation of the discovery forming the basis of the present invention, it has been disclosed hereinabove that the amount of local heating generated adjacent an electrode-work piece juncture is dependent, at least in part, upon the direction of current flow; and further, that local heating traceable to such cause, is primarily dependent upon the initial direction of current flow.

Many types of apparatus may be employed to obtain controlled direction of current flow. For example, it may be convenient to employ a suitable welding timer incorporating mechanism for starting each application of current in one and the same direction, the timer having a reversing switch where it is desirable to reverse the uniform initial direction of current flow.

Although no comprehensive explanation of the process of the invention hereinabove described can be given, the theory is advanced that the effective resistance at, or adjacent, a bi-metal jucture formed between an electrode and a work piece varies with the direction of current flow, and is more noticeable at the beginning of the flow of current. It is a further theory that the discovery, upon which the present invention is based, is traceable to the difference in relative electropotential of the electrode and work piece metals, copper and its alloys, for example, being more electropositive than the light metals such as aluminum, magnesium, and alloys thereof. In any event, the theories advanced herein are merely explanatory and of incidental importance, since the method and advantages of the discovery and invention have been fully and clearly defined herein; the preferred method has been described so that one skilled in the art may practice the invention, together with the various modifications thereof which will suggest themselves. Such modifications of the improved process may be made and practiced without departing from the scope of the invention, and are intended to be included within the purview of the appended claims.

What is claimed is:

1. In the art of resistance welding wherein work pieces are welded by pressure exerted through electrodes and passage of current therethrough, the improvement which consists in affecting the amount of local heating at a selected bi-metal electrode-work piece juncture by the steps of selecting the electrode-work piece juncture at which local heating is to be affected in the desired way, and of at least initially controlling the welding current so that the flow thereof at that juncture is in a direction selected to produce the desired effect, whereby at least the initial current flow may be directed to minimize or maximize the total local heating developed at the particular selected juncture between an electrode and a work piece.

2. In making a resistance weld, minimizing local heating at a selected, bi-metal electrode-work piece juncture by selecting the juncture to be affected and at least initially controlling the welding current so that the conventional direction of flow thereof at that juncture is from the more electronegative metal to the more electropositive metal forming the bi-metal juncture.

3. In making a resistance weld, minimizing local heating at a selected copper electrode-light metal work piece juncture by selecting the juncture to be affected and at least initially controlling the welding current so that the conventional direction of flow thereof at that juncture is from the light metal work piece to the copper electrode.

4. In making a spot weld in aluminum metal, minimizing local heating at a selected copper electrode-aluminum work piece juncture by selecting the juncture to be affected and at least initially controlling the welding current so that the conventional direction of flow thereof at that juncture is from the aluminum work piece to the copper electrode.

5. In making a spot weld in magnesium metal, minimizing local heating at a selected copper electrode-magnesium work piece juncture by selecting the juncture to be affected and at least initially controlling the welding current so that the conventional direction of flow thereof at that juncture is from the magnesium work piece to the copper electrode.

6. In the art of resistance welding wherein work pieces are welded by pressure exerted through electrodes and passage of current therethrough, the improvement which consists in affecting the amount of local heating at successively selected bi-metal electrode-work piece junctures by the steps of, at the beginning of each successive weld, selecting the electrode-work piece juncture at which local heating is to be affected in the desired way, and of at least initially controlling the welding current so that the flow thereof at that juncture is in a direction selected to produce the desired effect, whereby at least the initial current flow may be directed in successive welds to minimize or maximize the total local heating developed at particular selected electrode-work piece junctures.

7. In the procedure of making a plurality of resistance welds, minimizing local heating at successively selected, bi-metal junctures between an electrode and the surface of a work piece by, at the beginning of each successive weld, controlling the welding current so that the conventional direction of flow of the first one-half cycle thereof at the particular juncture selected is from the more electronegative metal to the more electropositive metal forming the particular bi-metal juncture.

8. In the procedure of making a plurality of resistance welds, minimizing local heating at successively selected junctures between a copper electrode and the surface of a light metal work piece by, at the beginning of each successive weld, controlling the welding current so that the conventional direction of flow of the first one-half cycle thereof at the particular juncture selected is from the light metal work piece to the copper electrode.

9. In the process of effecting a plurality of spot welds in magnesium metal, at the beginning of each spot weld, minimizing local heating at successively selected copper electrode-magnesium work piece junctures by controlling the welding current so that the first one-half cycle thereof will have a conventional direction of flow from the magnesium work piece to the copper electrode.

10. In the process of effecting a plurality of spot welds in aluminum metal, at the beginning of each spot weld, minimizing local heating at successively selected copper electrode-aluminum work piece junctures by controlling the welding current so that the first one-half cycle thereof will have a conventional direction of flow from the aluminum work piece to the copper electrode.

11. In making a resistance weld, maximizing local heating at a selected, bi-metal, electrode-work piece juncture by selecting the juncture to be affected and at least initially controlling the welding current so that the conventional direction of flow thereof at that juncture is from the more electropositive metal to the more electronegative metal forming the bi-metal juncture.

12. In making a resistance weld, maximizing local heating at a selected copper electrode-light metal work piece juncture by selecting the juncture to be affected and at least initially controlling the welding current so that the conventional direction of flow thereof at that juncture is from the copper electrode to the light metal work piece.

13. In making a spot weld in aluminum metal, maximizing local heating at a selected copper electrode-aluminum work piece juncture by selecting the juncture to be affected and at least initially controlling the welding current so that the conventional direction of flow thereof at that juncture is from the copper electrode to the aluminum work piece.

14. In making a spot weld in magnesium metal, maximizing local heating at a selected copper electrode-magnesium work piece juncture by selecting the juncture to be affected and at least initially controlling the welding current so that the conventional direction of flow thereof at that juncture is from the copper electrode to the magnesium work piece.

15. In the procedure of making a plurality of resistance welds, maximizing local heating at successively selected, bi-metal junctures between an electrode and the surface of a work piece by, at the beginning of each successive weld, controlling the welding current so that the conventional direction of flow of the first one-half cycle thereof at the particular juncture selected is from the more electropositive metal to the more electronegative metal forming the particular bi-metal juncture.

16. In the procedure of making a plurality of resistance welds, maximizing local heating at successively selected junctures between a copper electrode and the surface of a light metal work piece by, at the beginning of each successive weld, controlling the welding current so that the conventional direction of flow of the first one-half cycle thereof at the particular juncture selected is from the copper electrode to the light metal work piece.

17. In the process of effecting a plurality of spot welds in magnesium metal, at the beginning of each spot weld, maximizing local heating at successively selectel copper electrode-magnesium work piece junctures by controlling the welding current so that the first one-half cycle thereof will have a conventional direction of flow from the copper electrode to the magnesium work piece.

18. In the process of effecting a plurality of spot welds in aluminum metal, at the beginning of each spot weld, maximizing local heating at successively selected copper electrode-aluminum work piece junctures by controlling the welding current so that the first one-half cycle thereof will have a conventional direction of flow from the copper electrode to the aluminum work piece.

GEORGE S. BERNARD, Jr.